(12) United States Patent
Patterson

(10) Patent No.: US 8,468,794 B1
(45) Date of Patent: Jun. 25, 2013

(54) ELECTRIC PROPULSION APPARATUS

(75) Inventor: Michael J. Patterson, Brunswick, OH (US)

(73) Assignee: The United States of America as Represented by the Administrator of National Aeronautics and Space Administration, Washington, DC (US)

(*) Notice: Subject to any disclaimer, the term of this patent is extended or adjusted under 35 U.S.C. 154(b) by 477 days.

(21) Appl. No.: 12/894,565

(22) Filed: Sep. 30, 2010

Related U.S. Application Data

(60) Provisional application No. 61/295,326, filed on Jan. 15, 2010.

(51) Int. Cl.
*F03H 1/00* (2006.01)

(52) U.S. Cl.
USPC .......................................................... 60/202

(58) Field of Classification Search
USPC ............... 60/202; 313/359.1, 360.1, 361.1, 313/362.1, 363.1; 315/111.01–111.91
See application file for complete search history.

(56) References Cited

U.S. PATENT DOCUMENTS

| | | | | |
|---|---|---|---|---|
| 3,156,090 | A * | 11/1964 | Kaufman | 60/202 |
| 3,613,370 | A * | 10/1971 | Paine | 60/202 |
| 3,956,666 | A * | 5/1976 | Reader et al. | 315/111.81 |
| 3,969,646 | A * | 7/1976 | Reader et al. | 313/359.1 |
| 4,011,719 | A * | 3/1977 | Banks | 60/202 |
| 4,825,646 | A * | 5/1989 | Challoner et al. | 60/202 |
| 5,448,883 | A * | 9/1995 | Meserole et al. | 60/202 |
| 5,924,277 | A * | 7/1999 | Beattie et al. | 60/202 |
| 7,180,243 | B2 * | 2/2007 | Secheresse et al. | 315/111.61 |
| 7,560,870 | B2 * | 7/2009 | Tamida et al. | 315/111.81 |
| 2006/0010851 | A1 * | 1/2006 | Cagan et al. | 60/202 |

* cited by examiner

*Primary Examiner* — Phutthiwat Wongwian
(74) *Attorney, Agent, or Firm* — Robert H. Earp, III

(57) ABSTRACT

An electric propulsion machine includes an ion thruster having an annular discharge chamber housing an anode having a large surface area. The ion thruster includes flat annular ion optics with a small span to gap ratio. Optionally, a second electric propulsion thruster may be disposed in a cylindrical space disposed within an interior of the annulus.

20 Claims, 12 Drawing Sheets

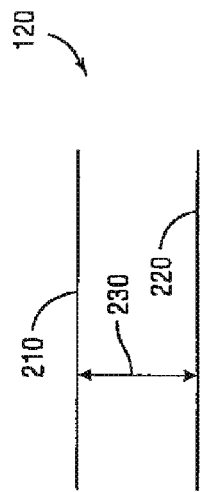
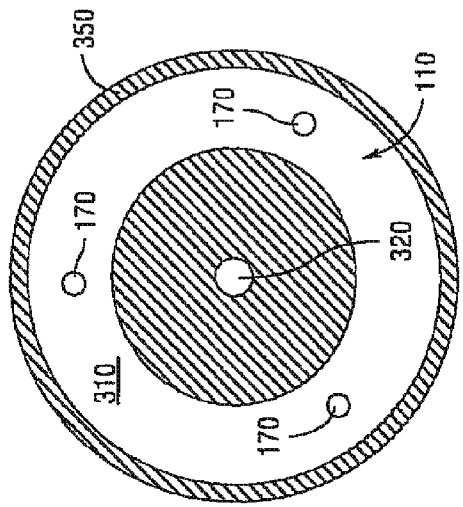
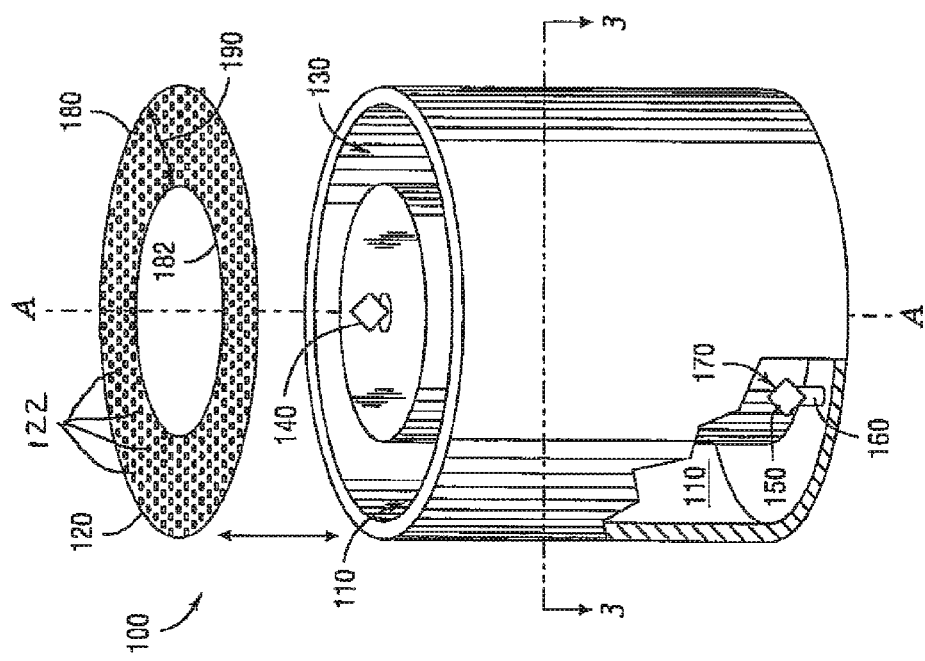

ELECTRIC PROPULSION APPARATUS

CROSS-REFERENCE TO RELATED APPLICATIONS

This application claims priority to U.S. Provisional Application Ser. No. 61/295,326 filed Jan. 15, 2010.

ORIGIN OF THE INVENTION

The invention described herein was made by employees of the United States Government and may be manufactured and used by or for the Government for Government purposes without the payment of any royalties thereon or therefore.

BACKGROUND

Two general types of electric propulsion thrusters used in space include ion thrusters and Hall-effect thrusters.

Both ion thrusters and Hall-effect thrusters are 'electrostatic' electric propulsion devices used for spacecraft propulsion that create thrust by accelerating ions. The thrust created is very small compared to conventional chemical rockets, but a very high specific impulse, or high exhaust velocity, which reduces the propellant requirements for missions is obtained. This high 'propellant efficiency' is achieved through the very frugal propellant consumption of the electric propulsion system. They do however require large amounts of power; typically 1 kWe per 0.030-0.040 Newtons thrust for ion thrusters, and 1 kWe per 0.050-0.080 Newtons thrust for Hall-effect thrusters.

Ion thrusters and Hall-effect thrusters both generate a beam of ions (electrically charged atoms or molecules) to create thrust in accordance with Newton's third law. The method of accelerating the ions varies, but all designs take advantage of the charge/mass ratio of the ions. This ratio means that relatively small potential differences can create very high exhaust velocities. This reduces the amount of reaction mass or fuel required, but increases the amount of specific power required compared to chemical rockets. Electric propulsion thrusters are therefore able to achieve extremely high specific impulses.

The drawback of the low thrust is low spacecraft acceleration because the mass of current electric power units is directly correlated with the amount of power required. This low thrust makes electric propulsion unsuited for launching spacecraft into orbit, but they are ideal for in-space propulsion applications.

Gridded electrostatic ion thrusters commonly utilize xenon gas. This gas has no charge and is ionized by bombarding it with energetic electrons. These electrons can be provided from an electron source as a hot cathode filament, or more typically a hollow cathode assembly (HCA), which are then accelerated in the electrical field of the cathode fall to the anode (Kaufman type ion thruster).

The positively charged ions are extracted by an extraction system consisting of 2 or 3 multi-aperture grids. After entering the grid system via the plasma sheath the ions are accelerated due to the potential difference between the first and second grid (named screen and accelerator grid) to the final ion energy of typically 1-2 keV, thereby generating the thrust. Typical ion velocities are in the range of 20,000-50,000 m/s, and higher for some energetic mission applications.

In spacecraft propulsion, a Hall-effect thruster also accelerates ions by an electric field. Hall-effect thrusters trap electrons in a radial magnetic field and then use the electrons to ionize propellant, efficiently accelerate the ions to produce thrust, and neutralize the ions in the plume.

The essential working principle of the Hall-effect thruster is that it uses an electrostatic potential to accelerate ions up to high speeds but does so without the application of a gridded extraction system used in ion thrusters. In a Hall-effect thruster the attractive negative charge is provided by an electron plasma at the open end of the thruster instead of a grid. A radial magnetic field of a few tens of milli-Tesla is used to confine the electrons, where the combination of the magnetic field and an attraction to the anode upstream surface force a fast circulating electron current around the axis of the thruster and only a slow axial drift towards the anode occurs.

A propellant, such as xenon gas is fed through the anode, which has numerous small holes in it to act as a gas distributor. As the neutral xenon atoms diffuse into the channel of the thruster, they are ionized by collisions with high energy circulating electrons.

The xenon ions are then accelerated by the electric field between the anode and the cathode. The ions quickly reach speeds of around 15,000 m/s for a specific impulse of 1,500 seconds (15 kN·s/kg). Upon exiting however, the ions pull an equal number of electrons with them, creating a plume with no net charge. The axial magnetic field is designed to be strong enough to substantially deflect the low-mass electrons, but not the high-mass ions which have a much larger gyroradius and are hardly impeded. About 30% of the discharge current is an electron current which does not produce thrust, which limits the energetic efficiency of the thruster; the other 70% of the current is in the ions. The ionization efficiency of the thruster is thus around 90%.

The magnetic field thus ensures that the discharge power predominately goes into accelerating the xenon propellant and not the electrons, and the thruster turns out to be reasonably efficient.

Because of the counter-flowing electron and ion currents in the Hall-effect thruster channel, a greater ion flux can be achieved as compared to that of the ion thruster—thereby yielding higher thrust-to-power than ion thrusters. Ion thrusters however are capable of achieving higher exhaust velocities with higher overall thrust efficiencies.

BRIEF SUMMARY

It would be desirable in the propulsion field to provide an electric propulsion device that delivers the performance capabilities of high thrust-to-power devices (such as Hall-effect thrusters) and the high specific impulse of high total-impulse devices (such as electrostatic gridded-ion thrusters).

One limitation is that no single Electric Propulsion Thruster (EPT) exists which can operate over the full specific impulse range of interest and do so with the combined characteristics of both Hall-effect and ion thrusters, such as high Thrust-to-Power (T/P).

The design attributes of the Hall-effect thruster and the ion thrusters specific to their ion-acceleration systems: the Hall-effect thruster utilizes backstreaming electrons accelerated from an external cathode toward an anode upstream of a radial-geometry magnetic field within an azimuthally-symmetric channel to generate a plasma and create counter-flowing accelerated ion current; and the ion thruster utilizes a closely-spaced multi-aperture electrodes (electrostatic 'ion optics') with a large applied E-field to focus and accelerate ions from a discharge plasma to form a (space-charge-limited)~mono-energetic beam.

DESCRIPTION OF DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Elements may not be drawn to scale and in some instances, cross-hatching is not shown to improve clarity.

FIG. 1 is a perspective view of selected components of an exploded, partially cut-away, electric propulsion machine.

FIG. 2 is a side view of ion optics.

FIG. 3 is a cross-sectional view taken along line 3-3.

FIG. 9 is a simplified electric power circuit for an electric propulsion machine.

DETAILED DESCRIPTION

Figure 5:
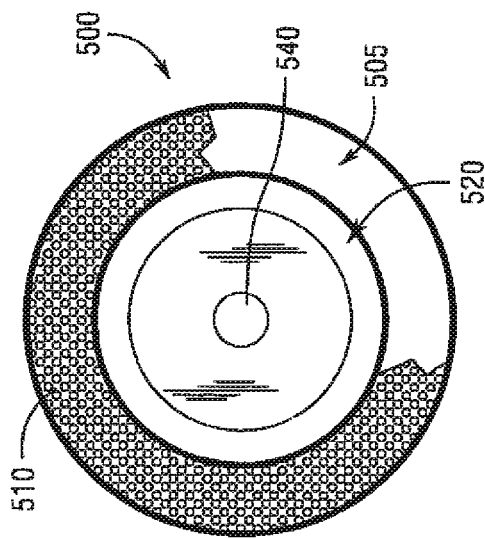
FIG. 5 is a top plan view, partially cut away, of an exemplary electric propulsion machine.

As used herein, the relevant design attributes of a Hall-effect and ion thrusters are their respective ion-acceleration systems: an azimuthally-symmetric channel with axial E-field and radial B-field for the Hall-effect thruster yielding closed-drift electrons to generate a plasma and create counter-flowing accelerated ion current; and closely-spaced multi-aperture electrodes or electrostatic ion optics with a large applied E-field to focus and accelerate ions from a discharge plasma to form a space-charge-limited mono-energetic beam for the ion thruster.

The plasma production and acceleration mechanisms of the Hall thruster are closely-coupled and are intimately connected to the geometric construction of the thruster discharge geometry.

On the other hand ion thrusters have de-coupled plasma production and acceleration mechanisms. As such, the thruster discharge geometry can be constructed in a variety of fashions without compromising the operational integrity of the ion thruster—so long as the acceleration mechanism, the electrode geometry, is maintained. An ion thruster discharge chamber may take a number of geometries—cylindrical, an oblate-spheroid, rectangular-box, etc. So long as there is a high degree of azimuthal symmetry to the ion thruster discharge geometry, a magnetic circuit can be designed to contain the discharge plasma that will yield a high discharge electrical efficiency. This is particularly true when the thruster is operated at high plasma densities. Maintaining high discharge electrical efficiency is an important consideration when trying to improve thrust to power (T/P)-ratio and overall thruster efficiency.

In a first embodiment illustrated in exploded and partially cut away FIG. 1, an electric propulsion machine includes an ion thruster 100 comprising an annular discharge chamber 110 and annular ion optics 120 covering an exhaust annulus 130. The ion thruster further includes a centrally-mounted neutralizer cathode 140 all arranged along a common axis A. Off axis A, but disposed within the annular discharge chamber 110, an exemplary ion thruster further includes at least one discharge cathode 150 and a propellant source 160 together forming a discharge cathode assembly 170. As further discussed below, an anode (not shown) is disposed within the annular discharge chamber 110.

It is appreciated that the ion optics 120 are shown "exploded." from the exhaust annulus 130. The ion optics 120 may be configured as a set of parallel annular electrodes having an outer radius 180 substantially conforming to an outside edge of the ion thruster 100. The ion optics further are defined by an inner radius 182 selected to ensure the exhaust annulus is covered by the ion optics 120. A distance or span 190 is defined between the outer radius 180 and the inner radius 182. Moreover, ion optics 120 include closely-spaced apertures 122, usually circular, through the thickness which are aligned between the electrodes. In one example, on the outer most electrode, the apertures are 0.075" diameter, with 0.093" center-to-center spacing in a hexagonal array, so the electrode has a very high open area fraction. Using the example, across any 1-inch span there are ~10 apertures.

With reference now to FIGS. 1 and 2, a side view illustrates that the ion optics 120 may include a set of two parallel, substantially planar annular electrodes, 210, 220. The electrodes are spaced apart by a substantially uniform gap 230. In an embodiment the electrodes 210, 220 comprise flat pyrolytic graphite ion optics.

With reference now to FIG. 3, a top-down, cross-sectional view taken along III-III of FIG. 1, illustrates one embodiment of a plurality of discharge cathode assemblies 170 distributed about a closed end 310 of the annular discharge chamber 110 opposite of the exhaust annulus. Propellant channel 320 provides a path of fluid communication to the neutralizer cathode 140. In another embodiment, the discharge chamber may be defined by a cylindrical shape 350 on an exterior side and a conic shape (not shown) on the interior producing a chamber of linearly increasing or decreasing annular, cross-sectional spans between the closed end to the exhaust annulus.

Figure 4:
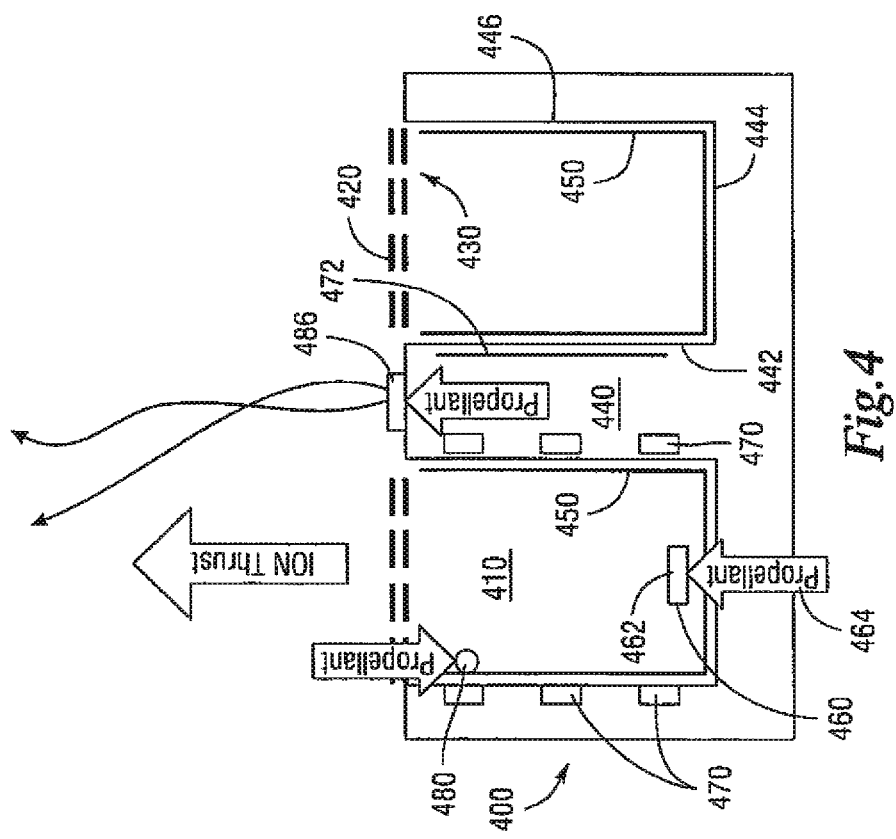
FIG. 4 is a side cross-sectional view of an electric propulsion machine.

With reference now to FIG. 4, cross-sectional, side view of an exemplary electric propulsion machine configured as an ion thruster 400 shows an annular discharge chamber 410 and annular ion optics 420 covering an exhaust annulus 430. The ion thruster 400 further includes a central cylinder 440 defining an interior surface 442 of the annular discharge chamber 410. The interior surface may be configured with magnetic shielding 472 to create a field-free region along the central core. Opposite the exhaust annulus 430, the discharge chamber 410 terminates in a closed annular end 444. An outermost surface 446 opposes the interior surface 442 and together, interior surface 442, closed end 444 and outermost surface 446 define the discharge chamber 410.

An anode 450 may be operatively disposed within and electrically insulated from the discharge chamber 410. In the illustrated embodiment, the anode 450 is electrically isolated and disposed along the interior surface 442, closed end 444 and outermost surface 446. Such an anode 450 provides additional surface area when compared to an anode disposed along only a single surface, for example the outer surface. As more completely described below, the added surface area improves electrical characteristics of the engine. Ion thruster 400 is further illustrated with a discharge cathode assembly 460 to generate a discharge plasma, the cathode assembly including a cathode 462 and propellant feed 464. Rare earth permanent magnets 470 are embedded within or formed integrally with the interior surface 442 and outermost surface 446 to establish a boundary magnetic circuit, of ring-cusp, or line-cusp geometry, to contain and control the energetic electrons emitted from the cathode assembly 460 to create an efficient plasma. Although only illustrated partially on a single side of the chamber 410, it is understood that the magnets 470 line the surfaces 442, 446. At least one ion plenum 480 is disposed toward the exhaust annulus 430 to provide a second, and primary, propellant feed.

One advantage of the illustrated ion thruster 400, as compared to ion thrusters of conventional configuration (cylindrical discharge with spherically-domed circular ion optics), includes the annular discharge chamber being able to provide for efficient packaging by providing a central position for mounting the neutralizer cathode assembly (NCA) 486 within the annulus. This reduces the outer profile of the engine and eliminates the need for a cantilevered-outboard NCA employed on conventional ion thrusters.

Another advantage of the illustrated ion thruster 400 includes the annular-geometry ion optics allowing for scaling of ion thrusters to very high power by permitting very-large beam areas with relatively small electrode spans, and relatively small span-to-gap ratios. This reduces the manufacturing, and the mechanical and thermal stability issues inherent with attempting to increase the beam area via increasing the diameter of spherically-domed ion optics as on conventional cylindrical ion thrusters.

Another advantage of the illustrated ion thruster 400 includes the annular-geometry ion optics allowing for the application of flat ion optics electrodes. Flat electrodes improve thrust to power (T/P)-ratios and efficiencies as compared to conventional ion thrusters by substantially reducing or eliminating the off-axis beam vectoring of ions which occurs with spherically-domed ion optics electrodes.

Another advantage of the illustrated ion thruster 400 includes the annular-shaped discharge chamber providing an opportunity to increase the effective anode-surface area for electron-collection as compared to a conventional cylindrically-shaped ion thrusters of equivalent beam area. This allows the illustrated engine to operate at the full-capability of the ion optics, and not have its maximum input power level limited by the available anode surface area. This increase in anode surface area allows the engine to operate at higher discharge currents and therefore higher beam currents and input power levels than a conventional ion thruster of equivalent beam area for a given specific impulse. Alternatively, for the same input power, the increased anode surface area associated with this annular geometry allows the engine to include a smaller outside diameter than a conventional ion thruster.

For example, the NEXT ion thruster (nominal 40 cm beam diameter) has a beam area of approximately 1257 $cm^2$, and a discharge chamber anode area of approximately 3334 $cm^2$. An engine according to the teachings here permit a smaller diameter (comparable to that of the 30 cm diameter NSTAR ion thruster) yielding a comparable discharge chamber anode area of approximately 3336 $cm^2$, using an outside annular discharge chamber diameter of only 31 cm and an inside annular discharge chamber diameter of 6 cm (inside which a neutralizer cathode assembly may be contained). As detailed in Table 1, an annular discharge chamber engine may support an annular beam area of about 727 $cm^2$ which is sufficient to support operation of the engine at the full-power operating power of the larger NEXT thruster—3.52 A beam current and 6.86 kWe. Such an engine would have a much reduced optics span, and optics span-to-gap ratio as compared to the NEXT ion thruster.

TABLE 1

| | Engine | |
|---|---|---|
| Attribute | Conventional EPT NEXT Ion Thruster | Annular Engine |
| Beam Diameter, cm | 40.0 | 31.0 |
| Beam Area, $cm^2$ | 1257 | 727 |
| Discharge Chamber Anode Surface Area, $cm^2$ | 3334 | 3336 |
| Anode Surface Area to Beam Area | 2.56:1 | 4.59:1 |
| Optics Span, cm | 40.0 | 12.5 |
| Optics Span-to-Gap Ratio | 606:1 | 189:1 |

In operation an annular thruster channels propellant flow through the discharge cathode assembly (DCA) 460, the ion plenum 480, and the central common NCA 486. As discussed more completely below, an Ion Anode Power Supply, an Ion Beam Power Supply and an Ion Accelerator Electrode Power Supply are all energized. Operating range would be typically 2000-5000 seconds specific impulse.

With reference now to FIG. 5, in another embodiment, a dual electric propulsion machine includes an ion thruster 500 comprising an annular discharge chamber 505 underlying ion optics 510 and a second thruster 520, illustrated and described here as a Hall-effect thruster. In this illustration an ion thruster 500 including an annular-shaped discharge chamber and annular-shaped ion optics 510 are mounted circumferentially around the exterior of a second thruster 520, a Hall-effect thruster arranged on a common axis and a centrally-positioned neutralizer cathode 540 common to both the ion and Hall-effect plasma sources.

Figure 6:
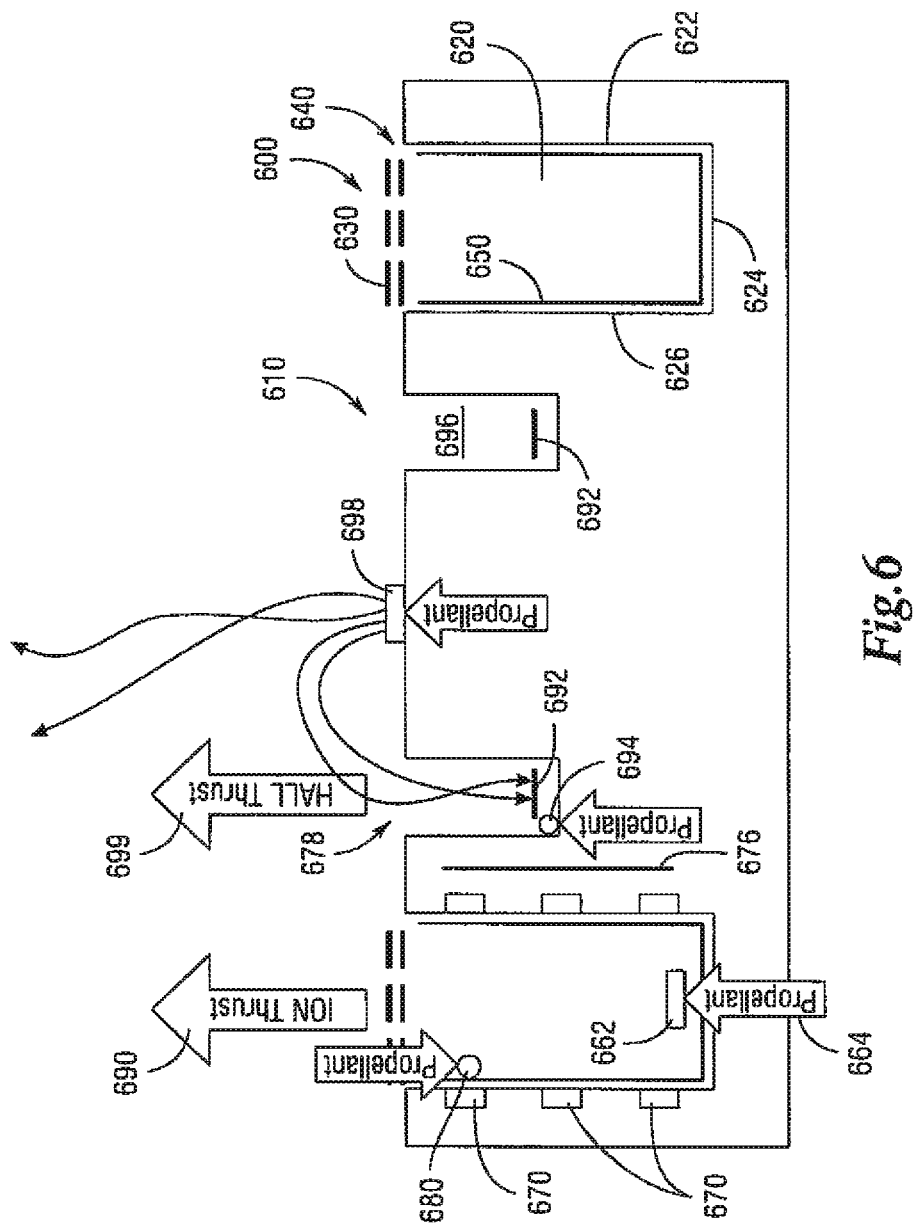
FIG. 6 is a side cross-sectional view of the electric propulsion machine shown in FIG. 5.

Referring now to FIG. 6, a cross-sectional, side view of the exemplary dual electric propulsion machine shown in FIG. 5 includes an annular ion thruster component 600 surrounding a central, second electric propulsion thruster component configured as a Hall-effect thruster 610. The annular ion thruster 600 includes an annular discharge chamber 620. The annular discharge chamber 620 is defined by an outer surface 622, a closed annular end 624 and an interior surface 626 that may be configured with magnetic shielding to magnetically shield the NCA from the magnetic circuit of the ion thruster and Hall-effect components 600, 610. The annular ion thruster 600 further includes annular ion optics 630 covering an exhaust annulus 640, and an anode 650 operatively disposed within and electrically insulated from the discharge chamber 610. While the illustrated anode 650 is configured to maximize surface area by occupying substantially the surface area of the outer surface 622, the closed end 624 and the interior surface 626, alternately structured anodes may occupy less of the interior space of the annular discharge chamber 620 depending on electrical and power requirements.

The annular ion thruster 600 is further illustrated with a discharge cathode assembly 660 to generate a discharge plasma, the cathode assembly including a cathode 662 and propellant feed 664. Permanent magnets 670 are embedded within the outer wall 622 and interior wall 626. As above, the magnets are only illustrated partially, it is understood that the magnets 670 may be annularly disposed within the walls 622, 626, or discreet magnets may be spaced around the discharge chamber 620 and/or spaced between the exhaust annulus 640 and the end 624. Additionally, at least one ion plenum 680 is disposed near the exhaust annulus 640 side of the chamber 620 to provide a second propellant feed. In operation, the annular ion thruster 600 provides thrust from the exhaust annulus 630 as indicated by the arrow 690 although it is appreciated that thrust is provided from all or substantially all of the exhaust annulus 640.

With continued reference to FIG. 6, the Hall-effect thruster component 610 may include a separate anode 692 and plenum 694 to supply propellant to the Hall closed drift channel 696 having a radial magnetic field and axial electric field to generate plasma and create counter flowing accelerated ion currents. Electron trajectories are illustrated by arrows emanating from a common neutralizer cathode 698 and thrust is illustrated by arrow 699 but understood to be distributed around the Hall-effect component 610.

In one embodiment, a dual electric propulsion machine provides for efficient packaging to minimize overall engine diameter.

In one embodiment of a dual electric propulsion machine using a Hall-effect thruster component 610 as the second propulsion engine, maintains the design integrity of the Hall-effect thruster to ensure its performance characteristics of high T/P-ratio at low specific impulse;

A centrally-located neutralizer cathode assembly (NCA) 698 may provide dual functionality as both the discharge plasma generation and beam neutralization for the Hall-effect component 610, and beam neutralization for the ion thruster component 600. Additionally, a centrally located NCA 698 may reduce the outer profile of the engine and eliminate the need for a cantilevered-outboard NCA (not shown) dedicated for the operation of the ion thruster.

The annular-geometry ion optics 630 allow for very-large beam areas while creating very small electrode spans, and very small span-to-gap ratios. This permits use of flat ion optics electrodes. Flat electrodes yield improved T/P-ratios and efficiencies as compared to Current ion thrusters. This is because conventional ion thrusters are cylindrical in geometry, requiring spherically-domed ion optics electrodes to ensure both adequate stiffness for launch vibration, and thermo-mechanical stability under thermal loads during operation to maintain a uniform, controlled inter-electrode gap over very-large spans. The domed electrodes however result in thrust-losses associated with beamlets directed off-axis. Reducing thrust-losses associated with off-axis beam vectoring by using flat electrodes result in an improvement in overall efficiency for a given input power as more completely described below.

The annular-shaped discharge chamber 620 of the ion component 600 of the dual electric propulsion machine increases the effective anode-surface area for electron-collection as compared to a conventional cylindrically-shaped ion thruster of equivalent beam area. This allows the ion thruster component 600 to operate utilizing the full-perveance capability of the ion optics 630, and not have its maximum input power level limited by the available anode surface area. This increase in anode surface area allows the ion component to operate at higher discharge currents and therefore higher beam currents and input power levels than current ion thrusters of equivalent beam area for a given specific impulse. This increase in input power capability will be more completely described below.

The increase in operable surface area due to expanded surface available in the annulus also creates more radiative surface, permitting operation at higher discharge power levels as compared to a comparable beam area thruster of conventional construction. This is expected to maintain acceptable temperature margins on critical components such as the rare-Earth permanent magnets.

Geometric differences in ion optics electrodes 630, and discharge chamber anode surface areas as compared to conventional ion thrusters are documented in Tables 2 and 3 respectively. For purposes of illustration, the center core, or second thruster of the dual thruster engine is assumed to be a NASA GRC 300M Hall-Effect thruster in this embodiment. The 300M is a 20 kW-class laboratory electric propulsion thruster with an external diameter of 15⅜" (39 cm).

Dual thruster engines with an ion thruster beam area equivalent to a conventional cylindrical ion thruster are listed in Table 2. As noted the dual thruster engine approach allows for a dramatic reduction in optics span, and span-to-gap ratio for a given beam area. Specifically, in one example, a 4-6× reduction in span and span-to-gap ratios. This comparatively small span is expected to result in a first-mode natural frequency high enough to allow for the use of flat electrodes. This in combination with the application of a long-life, low thermal coefficient-of-expansion material such as pyrolytic-graphite for the electrodes will provide an optimal flat-electrode design solution which is expected to eliminate the thrust-losses inherent with a domed electrode geometry used in conventional ion thrusters.

TABLE 2

| | Engine | | | | | |
| --- | --- | --- | --- | --- | --- | --- |
| | Conventional EPTs | | | Dual Thruster Engine | | |
| Optics Attribute | NSTAR | NEXT | 50 cm | A | B | C |
| Area, $cm^2$ | 625 | 1257 | 1963 | 625 | 1257 | 1963 |
| Span, cm | 28.2 | 40.0 | 50.0 | 4.56 | 8.43 | 12.2 |
| Span-to-Gap Ratio | 427:1 | 606:1 | 757:1 | 69:1 | 128:1 | 185:1 |

The differences in anode surface areas between conventional electric propulsion thrusters (Ion thrusters: NSTAR and NEXT are partial-conic; 50 cm is cylindrical) and the annular-portion (ion component) of the dual thruster engine having an equivalent beam area are documented in Table 3 (assuming a core of a 300M Hall-Effect thruster component). As noted, the dual thruster engine yields a much larger anode surface area for an equivalent beam area; e.g. ~2.4× increase in area as compared to the NEXT ion thruster. It should be noted that these calculations are based on the increase in geometric surface area of the anode. For ring-cusp magnetic circuit plasma discharges the actual effective anode surface area is the sum of the magnetic cusp lineal areas. While estimated, the surface area ratios documented in Table 3 should be reasonably accurate.

TABLE 3

| Attribute | Engine | | | | | |
|---|---|---|---|---|---|---|
| | Conventional EPTs | | | Dual thruster Engine | | |
| | NSTAR | NEXT | 50 cm | 'A' | 'B' | 'C' |
| Beam Area, cm$^2$ | 625 | 1257 | 1963 | 625 | 1257 | 1963 |
| Discharge Chamber Anode Surface Area, cm$^2$ | 2138 | 3334 | 5490 | 6776 | 7954 | 9192 |
| Anode Surface Area to Beam Area | 3.42:1 | 2.65:1 | 2.80:1 | 10.84:1 | 6.33:1 | 4.68:1 |
| Ratio of Dual Thruster Engine-to-Conventional EPT Anode Area | | | | 3.17:1 | 2.39:1 | 1.67:1 |

The comparatively-large surface area of the dual thruster engine anode compared to either beam area alone or anode area of conventional EPT's of the same or similar beam areas allows for operation at higher discharge currents. This enables operation at much higher power levels, thereby taking full-advantage of the current-extraction capability (perveance) of the ion optics.

Several other design features and attributes of embodiments of the dual thruster-engine are noted here, with continued reference to FIG. 6.

The Hall-effect component 610 of the dual thruster engine may be of conventional construction, using a solenoid electromagnet (not shown) to create the appropriately-shaped radial magnetic field at the exit plane of the channel. Use of a centrally-located cathode 698, and implementation of the extensible-channel concept (to enhance life time) employed on the NASA GRC HiVHAC low power Hall-effect thruster may be used in the dual thruster.

A ring-cusp magnetic circuit is shown within the annular ion discharge chamber 620, created by rows of alternating-polarity rare-Earth permanent magnets 670 attached or embedded within the surfaces of the annular discharge chamber surfaces 622, 626. Magnetic shielding 676 may be added between the exterior of the Hall-effect discharge 678 and the ion exhaust annulus 640 to separate the magnetic circuits of the two discharges. Alternately, it may be possible to use the fringe-magnetic field created by the Hall-effect discharge solenoid magnet—which would naturally penetrate into the annular ion discharge chamber 620 without shielding—and shape it by appropriate application of magnetic materials within the walls of the annular ion discharge chamber 620 to generate and control the discharge plasma in this zone. This would be with the potential benefit of reduced mass by elimination of the rare-Earth permanent magnets 670.

The annular discharge chamber 620 of the ion thruster component 600 may include a conventional discharge cathode assembly (DCA) 662 to generate the discharge plasma.

Typical ion thrusters require 3 separate propellant feeds; a Hall-effect thruster 2 propellant feeds. In one embodiment a dual thruster uses a total of 4 separate propellant feeds: one each for the ion discharge 680 and Hall discharge 694; one for the ion DCA 664; and one for the central common NCA 698.

The annular discharge chamber 620 of the ion thruster component 600 may use a 'reverse-feed' plenum which may inject the propellant from the ion optics-end of the discharge backwards, giving it an initial axial velocity component resulting in an increased neutral atom residence time and improved propellant efficiency.

The dimensions of the channel width and depth of the Hall-effect component 610 would be defined by the intended operating power level(s).

The annular area of the ion optics 630 would be established by the intended operating power level(s), which would then establish the electrode span (and discharge channel width) and overall dual thruster outside diameter.

The depth of the annular ion component discharge chamber 620 may include a tradeoff of electrical and propellant efficiencies, maximum desired input power, and overall dual thruster mass. It may be, for example, most effective mechanically and magnetically to match the channel depths of the ion thruster component 600 and the Hall-effect component 610.

Figure 7:
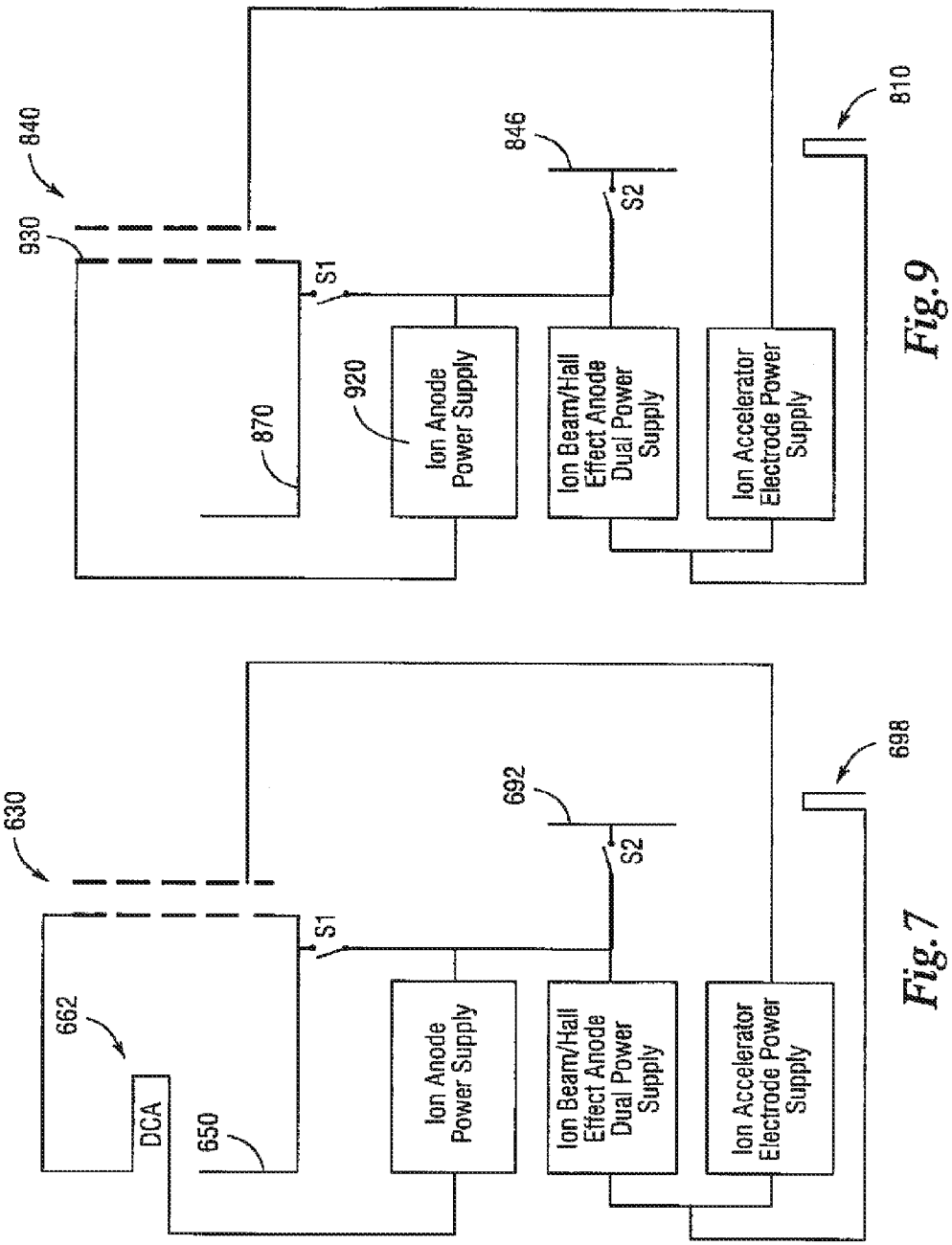
FIG. 7 is a simplified electric power circuit for an electric propulsion machine.

With reference now to FIG. 7, a simplified electrical diagram for a dual thruster is shown. Of note is that sufficient commonality exists in the requirements associated with the ion thruster component 600 beam power supply and the Hall-effect component 610 anode power supply that this function could be performed by a common power converter.

Figure 8:
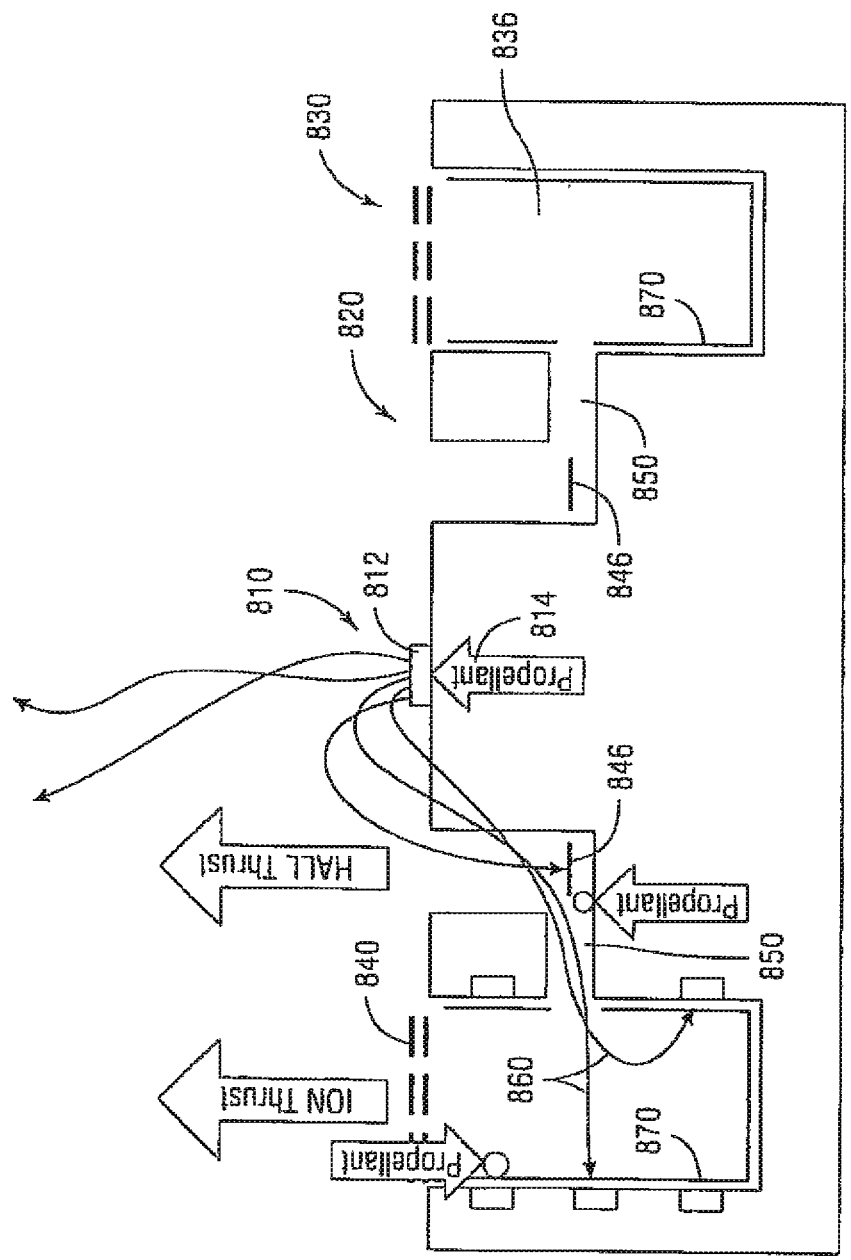
FIG. 8 is a side cross-sectional view of an alternate manifestation of an electric propulsion machine.

With reference now to FIG. 8, in another embodiment of the dual thruster, it may be advantageous to eliminate the DCA, and rely on the central common NCA 810 for plasma generation and beam neutralization of both the Hall-effect thruster component 820 and ion thruster component 830 of the dual thruster. Such a device may comprise one hollow cathode emitter 812 and propellant feed 814, reducing the total propellant feeds for the engine from 4 to 3.

One additional advantage to this approach is to eliminate the asymmetry in the ion thruster component 830 created by a singular discharge cathode assembly within an annular-shaped discharge chamber 836. This asymmetry could cause a (minor) asymmetry in the plasma at the plane of the ion optics 840, and also result in a (minor) asymmetry in the magnetic circuit ('a hole') in the area of the DCA resulting in an increase in discharge electrical losses.

In the same manner that the discharge plasma is generated for the Hall-effect component, namely electron-back-streaming of current from the NCA 810 to the Hall-effect anode 846, it is expected that a discharge plasma for the ion thruster component 830 may be generated similarly. In the embodiment illustrated in FIG. 8, radial slots 850 are provided around the circumference of the exterior of the Hall-effect component 820 to provide a passage to the annular-shaped discharge chamber 836 for neutrals, ions, and energetic electrons.

By appropriate shaping of the magnetic field in the passage (e.g. —axial B-field component across the radial slots) and de-energizing the Hall-effect solenoid (not shown) creating the downstream radial B-field component in the Hall channel, it should be possible to back-stream electrons 860 from the NCA 810, through the radial slots 850 toward the ion discharge anode 870 and in the process deplete their energy and use them efficiently to generate the ion thruster discharge plasma. The location of electron current collection and hence which discharge is operated (Hall-effect or ion) could be controlled by the switches identified in FIG. 7 and by the propellant flow rates through the respective plena. Alterations are available to artisans to optimize the magnetic field of the ion discharge may be accomplished to meet design constraints.

With reference now to FIG. 9, a simplified electrical schematic for a dual thruster embodiment having a single, central neutralizer cathode assembly 810 is shown. Although there is no longer a separate DCA discharge, the ion anode power supply 920 remains to provide a bias voltage to the screen electrode 930 of the ion optics 840.

Figure 10:
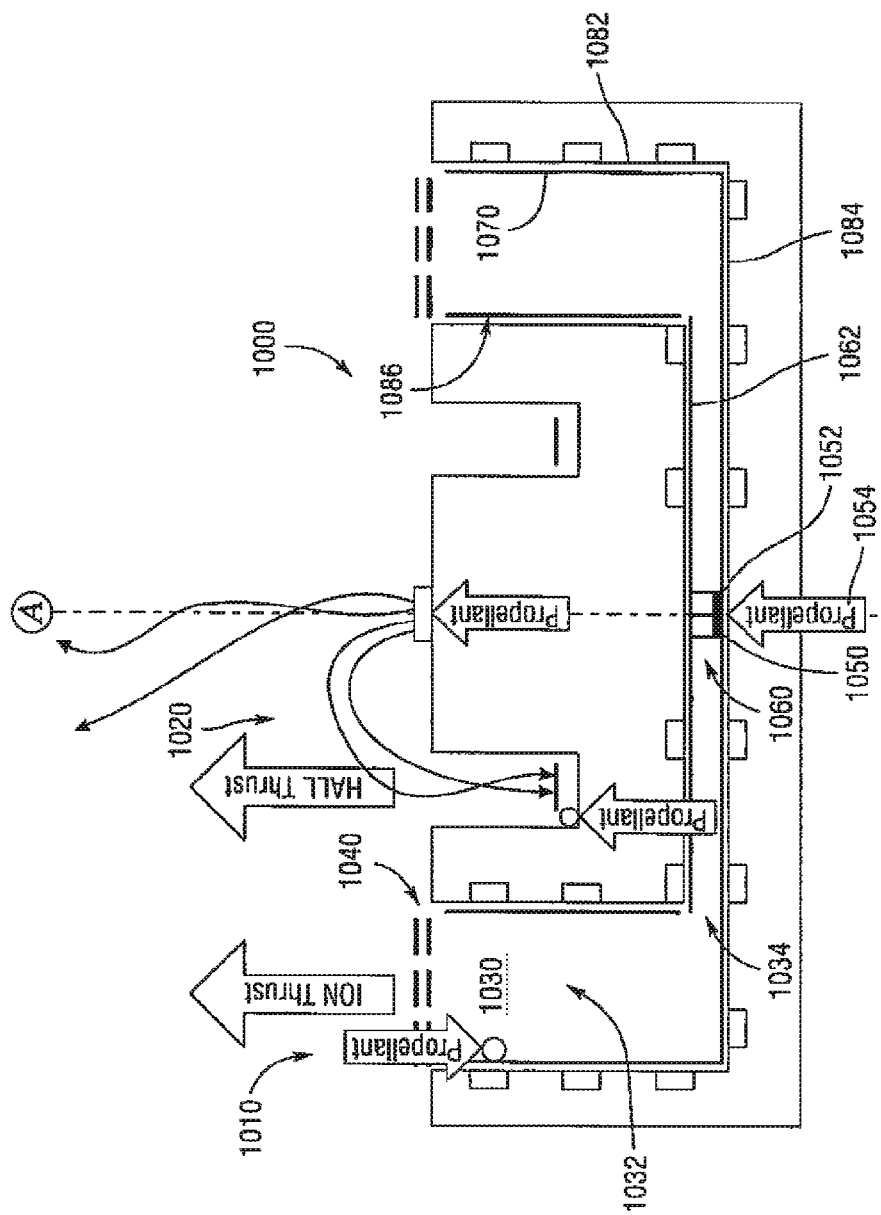
FIG. 10 is a side cross-sectional view of an alternate manifestation of an electric propulsion machine.

With reference now to FIG. 10, in yet another embodiment, a dual engine thruster 1000 includes an ion thruster component 1010 and a Hall-effect component 1020. While similar in many respects to the embodiments above, one distinction lies in the ion discharge chamber 1030 and an attempt to eliminate asymmetries caused by off-axis discharge cathode assemblies in the annular discharge chamber. Specifically, discharge chamber 1030 includes an annular section 1032 and a cylindrical section 1034. Annular section 1032 is bordered on one side by the exhaust annulus 1040 and by the cylindrical section 1034 on the opposing side. Desirably, a single discharge cathode assembly 1050 including cathode 1052 and propellant feed 1054 lies on central axis A. To support the Hall-effect component 1020, a mechanical support 1060 is provided, although it is appreciated that other supports in addition to the illustrated mechanical support could be interchanged. Supporting floor 1062 of mechanical support 1060 is insulated from the annular ion anode (discussed below) and is held at cathode potential.

The illustrated embodiment includes an annular ion anode 1070 of potentially greater surface area permitting higher currents and desirable features as described above. In the embodiment shown, annular ion anode 1070 lines but is insulated from an exterior surface 1082, a bottom 1084 of the cylindrical section, and an interior surface 1086.

Figure 11:
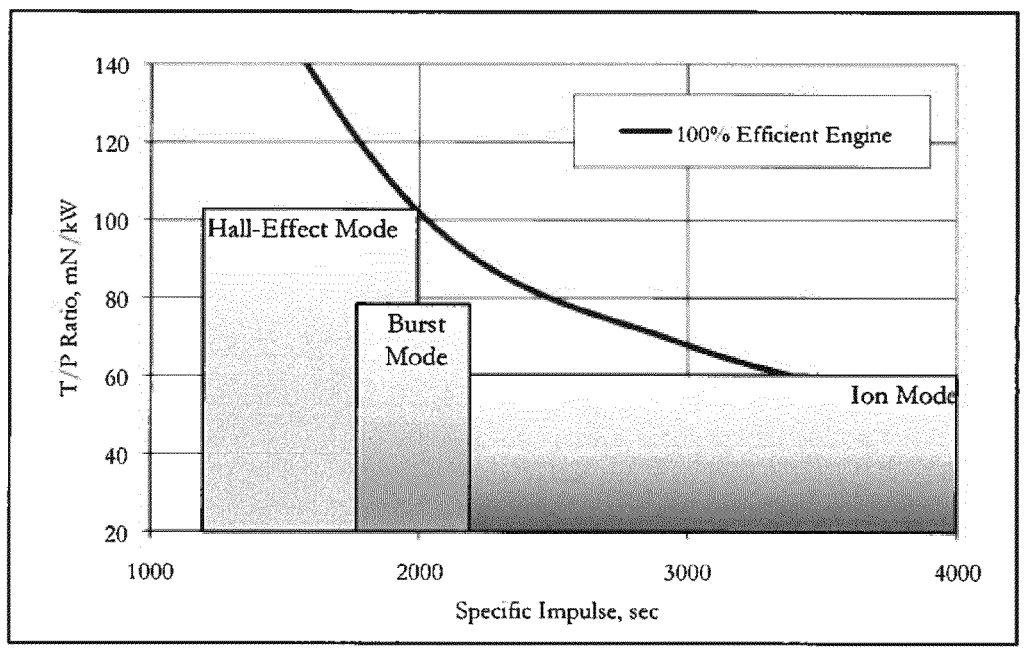
FIG. 11 is a chart illustrating operating modes of an exemplary electric propulsion machine.

As described in the embodiments above, a dual thruster is anticipated to have certain operational and performance characteristics. For example, a dual thruster can be operated in multiple 'modes.' Referring now to FIG. 11, in a 'Hall-effect mode' 1110 the propellant flow is channeled through the Hall plenum and the central common NCA. The solenoid to generate the radial magnetic field component and the Ion Beam/Hall-Effect Anode Dual Power Supply are energized. S1 switch is open, and S2 switch is closed. The Hall-effect component of the dual thruster is then operated as a conventional Hall thruster. Operating range would be typically 1200-2000 seconds specific impulse as seen at 1110.

As another example, the dual thruster can be operated in an 'ion mode' 1120 where the propellant flow is channeled through the ion plenum, the DCA, and the central common NCA. The Ion Anode Power Supply, the Ion Beam/Hall-Effect Anode Dual Power Supply, and the Ion Accelerator Electrode Power Supply are all energized. S1 switch is closed, and S2 switch is open. The ion component of the dual thruster is then operated as a conventional ion thruster. Operating range would be typically 2000-4000 seconds specific impulse as seen at 1120.

In yet another example, the dual thruster can be operated in a 'burst mode' 1130 where the propellant flow is channeled through all 4 locations, all power supplies are energized, and both S1 and S2 switch are closed. The Hall-effect and ion components of the dual thruster are then both operated simultaneously. Operation would be typically in the 1800-2200 seconds specific impulse range, in a zone where both components are capable of functioning with some overlap in capability 1130. This mode is theoretically possible but may not be operationally advantageous. However, two potential reasons for operating in this burst mode include: (a) Providing a seamless-transition in specific impulse throttling between Hall-effect mode 1110 and ion mode 1120 operation; and (b) assuming there is sufficient capability in the power electronics and propellant management system, operating at a total input power and generating a total thrust level for the dual thruster exceeding that which could be achieved by either the Hall-effect or ion components alone.

As mentioned above in discussing the annular discharge chamber ion thruster, when the dual thruster is operated in ion mode 1120 higher efficiencies at fixed input power, and higher input power at fixed specific impulse are possible, as compared to conventional ion thrusters. For example, the flat-geometry of the ion optics electrodes afforded by the annular design will improve the efficiency of the thruster as compared to a conventional ion thruster of equivalent beam area. This is because the thrust-losses associated with beam divergence due to the domed shape of conventional ion thrusters are eliminated in the annular design.

Moreover, both the specific impulse and the thrust are proportional to the thrust-loss correction factor due to off-axis beam vectoring ($F_t$); hence the overall thruster efficiency, which includes the specific impulse and thrust terms, is proportional to $F_t^2$. The correction $F_t$ includes both the beam divergence due to the electrode dome shape $F_{t-d}$ and beam divergence due to beamlet expansion $F_{t-b}$.

From equation 9 of Soulas, G. C., "Design and Performance of 40 cm Ion Optics," the NEXT ion thruster optics (dome height of approximately 2.35 cm and chord of 18 cm) $F_{t-d}$ is estimated to be approximately 0.983. Hence, the reduction in thrust and specific impulse, and overall thruster efficiency of the NEXT ion thruster due to off-axis beam vectoring caused by the domed ion optics is expected to be 0.017, or −1.7% $\{100*(F_{t-b}-1.00)\}$ in thrust and specific impulse, and 0.034, or −3.4% $\{100*(F_{t-b}^2-1.00)\}$ in efficiency at all throttle conditions. Therefore, all else being equal, for an equivalent beam area dual thruster with flat ion optics ($F_{t-d}$ equal to 1.00), a 3.4% increase in efficiency as compared to the NEXT ion thruster would be expected across the entire specific impulse range as seen below:

TABLE 4

| Throttle level/Input Power Level, kW | Thruster | | | | | |
|---|---|---|---|---|---|---|
| | NEXT-STEP & NEXT | | | Annular Ion Thruster | | |
| | T/P-ratio, mN/kW | Specific Impulse, sec | Efficiency | T/P-ratio, mN/kW | Specific Impulse, sec | Efficiency |
| —/2.498 | 60.8 | 1711 | 0.499 | 61.8 | 1740 | 0.516 |
| —/3.658 | 54.9 | 2240 | 0.601 | 55.8 | 2277 | 0.621 |
| —/4.818 | 50.0 | 2666 | 0.655 | 50.8 | 2711 | 0.677 |
| TL23/2.816 | 42.2 | 3090 | 0.640 | 42.9 | 3142 | 0.662 |
| TL25/3.683 | 37.8 | 3616 | 0.670 | 38.4 | 3676 | 0.693 |
| TL12/2.439 | 32.9 | 3999 | 0.645 | 33.4 | 4066 | 0.667 |
| TL40/6.860 | 34.5 | 4188 | 0.708 | 35.1 | 4258 | 0.732 |

One of the design issues with the NEXT thruster, and other conventional partial-conic or cylindrical discharge chamber ion thrusters (such as the NSTAR ion thruster, or the NASA GRC 50 cm laboratory model ion thruster), is that they cannot take full advantage of the ion current extraction capability of the ion optics technology—and hence operate at-or-near their maximum theoretical input power capability.

The NEXT neutralizer cathode, discharge cathode, magnets, ion optics, and high voltage propellant isolators all have adequate thermal and/or operational margins for operation at extremely-high input power levels; well in excess of the 7 kW maximum input power of the NEXT throttle table. Additionally, conventional NEXT ion optics are capable of operating at beam currents well-in-excess-of the maximum 3.52 A of the NEXT throttle table; >>7.0 A beam currents at full total voltage (2010 V). Application of advanced high-perveance design ion optics to the NEXT thruster would allow for operation at beam currents >>7.0 A at low total and beam voltages, thus enabling truly-high Thrust-to-Power operation.

Unfortunately, although operation at these high beam currents is consistent with the ion extraction system electrostatic functionality, they require a maximum sustainable discharge current which exceeds that which can be supported by the available anode surface area of the NEXT thruster discharge chamber. The maximum sustainable discharge current for the NEXT thruster is estimated to be in the range of about 32-35 Amperes, yielding a maximum beam current of about 7.0 A.

As documented in Table 3, for a given beam area, implementation of the annular discharge chamber either in a dual thruster arrangement or as a stand-alone annular ion thruster increases the effective and available anode surface area, as compared to conventional ion thrusters. The larger anode surface area increases the permissible sustainable discharge current and therefore beam current and thruster input power for a given beam voltage (specific impulse). The increase in sustainable discharge current (and approximate equivalent increase in beam current and input power) will be either directly proportional to the increase in anode surface area— or—will be equal to the discharge current necessary to support the maximum perveance-limited beam current that the ion optics are capable of extracting, whichever is less.

For an ion thruster with beam area equivalent to that of the NEXT ion thruster, an increase in anode surface area of 2.4× is possible. This permits an increase in sustainable discharge current and increase in beam current and thruster input power for a given beam voltage (specific impulse).

The increase in input power for a dual thruster versus a NEXT ion thruster of equivalent beam area is documented in Table 5 for a range of specific impulse. As indicated in Table 5 the input power to the NEXT ion thruster is limited by the anode-area down to about 3340 seconds specific impulse. Below this level, both the anode-area and the ion optics current-extraction-capability limit the thruster input power.

The annular ion and dual thruster is also anode-area limited at high specific impulse (4430 seconds); the ion optics are capable of supporting >20 A beam current, which would require a discharge current of greater than 84 Amperes. Although at this specific impulse the engine is anode-area limited, the maximum input power and thrust for this engine are 2.4× higher than that feasible with the equivalent-beam area NEXT thruster, due to the larger anode area of the dual thruster. At 4140 seconds specific impulse and below the dual thruster maximum input power is limited by the ion optics current-extraction-capability. That is, the engine is much more capable of taking full-advantage of the ion optics electrostatics than the NEXT thruster. At about 3340 seconds specific impulse and below, the maximum input power and thrust are equivalent to the NEXT thruster.

TABLE 5

| Attribute | NEXT Ion Thruster | Dual Engine B (Tables 2 and 3) |
|---|---|---|
| Beam Area, $cm^2$ | 1257 | 1257 |
| Discharge Chamber Anode Surface Area, $cm^2$ | 3334 | 7954 |
| Maximum Sustainable Discharge Current, A | $\leq$35 | $\leq$84 |
| Maximum Anode-Area-Limited Beam Current, A | $\leq$7.0 | $\leq$16.8 |

| Specific Impulse sec | Max. Beam Current, A | Anode Area- or-Optics Limited | Max. Input Power, kW | Max. Thrust, mN | Max. Beam Current, A | Anode Area- or-Optics Limited | Max. Input Power, kW | Max. Thrust, mN |
|---|---|---|---|---|---|---|---|---|
| 4434 | 7.04 | Anode | 13.646 | 472.1 | 16.8 | Anode | 32.501 | 1127 |
| 4139 | 7.04 | Anode | 12.042 | 440.8 | 14.5 | Optics | 24.755 | 907.8 |
| 3908 | 7.04 | Anode | 10.865 | 416.2 | 11.0 | Optics | 16.951 | 650.2 |
| 3592 | 7.04 | Anode | 9.371 | 382.5 | 7.30 | Optics | 9.715 | 396.6 |
| 3338 | 7.04 | Anode/Optics | 8.287 | 355.5 | 7.04 | Optics | 8.287 | 355.5 |
| 3188 | 7.04 | Anode/Optics | 7.689 | 339.5 | 7.04 | Optics | 7.689 | 339.5 |
| 3031 | 7.04 | Anode/Optics | 7.082 | 322.8 | 7.04 | Optics | 7.082 | 322.8 |
| 2733 | 7.04 | Anode/Optics | 6.027 | 291.0 | 7.04 | Optics | 6.027 | 291.0 |

The data in Table 5 for the dual thruster are conservative estimates. This is because: a) the 1.7% increases in both specific impulse and thrust expected with the dual thruster due to the flat-geometry electrodes were not included; and b) the design of the dual thruster assumed the same ion optics electrostatic design as that of the NEXT thruster. The dual thruster could in fact incorporate an advanced-perveance ion optics design in an annular configuration—while maintaining the same beam area as the NEXT thruster optics. This dual thruster design would yield an increase in input power and thrust as compared to that documented in Table 5. It should be noted that there would be no advantage to applying advanced-perveance ion optics configuration to the NEXT thruster since its maximum beam current is already limited or inhibited by the anode-area.

Figure 12:
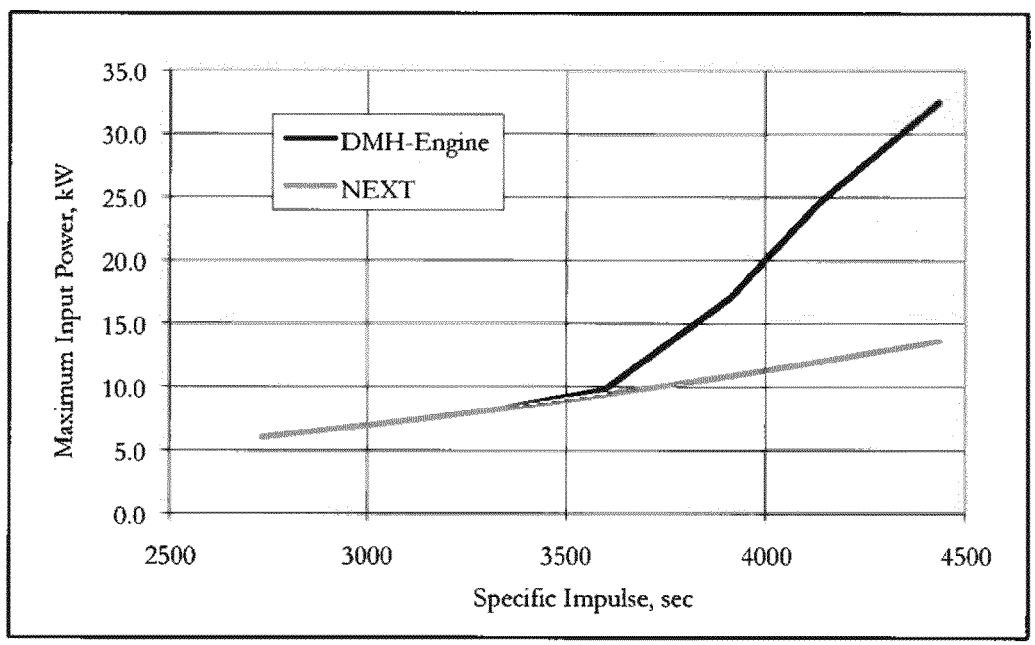
FIG. 12 is a plot illustrating maximum input power and specific impulse for an exemplary electric propulsion machine.

With reference now to FIG. 12, a graph illustrates the differences in maximum input power as a function of specific impulse for the Dual Engine B 1210 in Table 5 and an exemplary current thruster 1220 (NEXT) of equivalent beam area and electrode geometry and as set forth in Table 5. As can be seen, the slope of the curve 1210 dramatically increases above 3500 seconds specific impulse.

Figure 13:
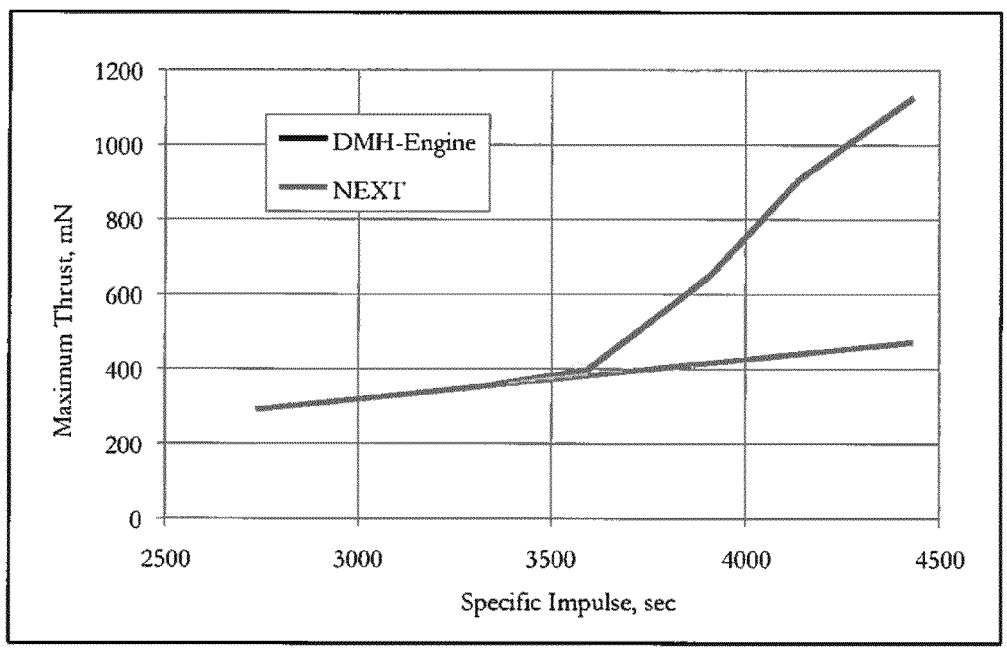
FIG. 13 is a plot illustrating maximum thrust and specific impulse for an exemplary electric propulsion machine.

With reference now to FIG. 13, a graph illustrates the differences in maximum thrust capability as a function of specific impulse for the Dual Engine B 1310 in Table 5 and an exemplary current thruster 1320 (NEXT) of equivalent beam area and electrode geometry and as set forth in Table 5. As can be seen, the slope of the curve 1310 dramatically increases above 3500 seconds specific impulse.

It can now be appreciated that many variations of the dual thruster described here are possible. For example: using a second, or interior thruster other than a Hall-effect component, combining various sizes of Hall-effect components and ion components, to yield difference total specific impulse throttling ranges, and different total ranges in input power and thrust capability—depending upon the application need. One case example is provided here to define overall performance of a dual thruster. This example is for illustration, with the performance characteristics quoted specific to the selected configuration. As such the performance numbers documented do not imply any particular limits in capability to the dual thruster concept in general.

Table 6 lists the projected performance capabilities of one embodiment of a dual thruster, with a Hall-effect component having physical characteristics similar to that of the NASA GRC 300M Hall thruster, and an Ion component with beam area equivalent to the NASA NEXT Ion thruster. The performance of the Hall-effect component with specific impulse was modeled assuming a similar efficiency-specific impulse characteristic as the BPT-4000 Hall-Effect thruster, with a nominal input power of 20 kW at 2000 seconds specific impulse which is the design basis for the 300M.

The ion component of the dual thruster was modeled in a fashion consistent with prior ion thruster performance modeling conducted by this author assuming a discharge chamber, propellant efficiency of 0.92. The performance gains due to the elimination of the thrust-losses associated with domed ion optics were included in these calculations. Additionally, an advanced-perveance ion optics electrode design was assumed using equation 15 of Patterson, M. J., "NEXT Study of Thruster Extended-Performance II (NEXT STEP II).

TABLE 6

| Mode | Specific Impulse, sec | Input Power, kW | Thrust, mN | Thrust-to-Power Ratio, mN/kW | Efficiency |
|---|---|---|---|---|---|
| Hall-Effect | 1220 | 4.440 | 351.1 | 79.0 | 0.473 |
| Hall-Effect | 1440 | 5.560 | 408.9 | 73.6 | 0.520 |
| Hall-Effect | 1610 | 6.670 | 457.8 | 68.7 | 0.542 |
| Hall-Effect | 1740 | 7.780 | 510.0 | 65.6 | 0.560 |
| Hall-Effect | 1840 | 13.330 | 844.4 | 63.3 | 0.572 |
| Burst | 1840 | 19.201 (13.330 + 5.871) | 1196 (844.4 + 351.5) | 62.3 | 0.562 |
| Burst | 1960 | 23.362 (20.000 + 6.362) | 1610 (1236 + 374.5) | 61.1 | 0.587 |
| Burst | 2150 | 27.206 (20.000 + 7.206) | 1540 (1129 + 411.0) | 56.6 | 0.597 |
| Ion | 2150 | 7.206 | 411.0 | 57.0 | 0.602 |
| Ion | 2207 | 7.471 | 421.7 | 56.4 | 0.611 |
| Ion | 2298 | 7.912 | 439.0 | 55.5 | 0.625 |
| Ion | 2538 | 9.172 | 484.9 | 52.9 | 0.658 |
| Ion | 2758 | 10.432 | 526.9 | 50.5 | 0.683 |
| Ion | 2774 | 12.188 | 614.1 | 50.4 | 0.685 |
| Ion | 3076 | 13.703 | 648.5 | 47.3 | 0.714 |
| Ion | 3235 | 15.634 | 716.3 | 45.8 | 0.727 |
| Ion | 3387 | 16.875 | 750.0 | 44.4 | 0.738 |
| Ion | 3645 | 19.561 | 823.6 | 42.1 | 0.752 |
| Ion | 3966 | 25.691 | 1010 | 39.3 | 0.765 |
| Ion | 4200 | 28.573 | 1070 | 37.5 | 0.771 |
| Ion | 4499 | 32.501 | 1146 | 35.3 | 0.778 |

Note in Table 6, 'Hall-Effect Mode' refers to the Hall-effect component operating solely (from 1220-1840 seconds specific impulse), 'Ion Mode' refers to the ion component operating solely (from 2150-4500 seconds specific impulse), and 'Burst Mode' refers to both components operating simultaneously. In this example case, burst mode is operated in the specific impulse 'overlap-zone' of 1840-2150 seconds specific impulse. The individual input power and thrust contributions of the two components in burst mode are documented in Table 6, with the first number associated with the Hall-effect component and the second number associated with the ion component.

As noted in Table 6, this dual thruster provides a continuous-throttling capability from 1220-4500 seconds specific impulse (3.7:1 range), with an input power range of 4.44-32.5 kW (7.3:1), thrust of 351-1146 mN (3.3:1), and efficiency of 0.47-0.78. A peak in input power and thrust occur over the specific impulse overlap-zone of the burst mode, with slight reduction in efficiency in this region.

Figure 14:
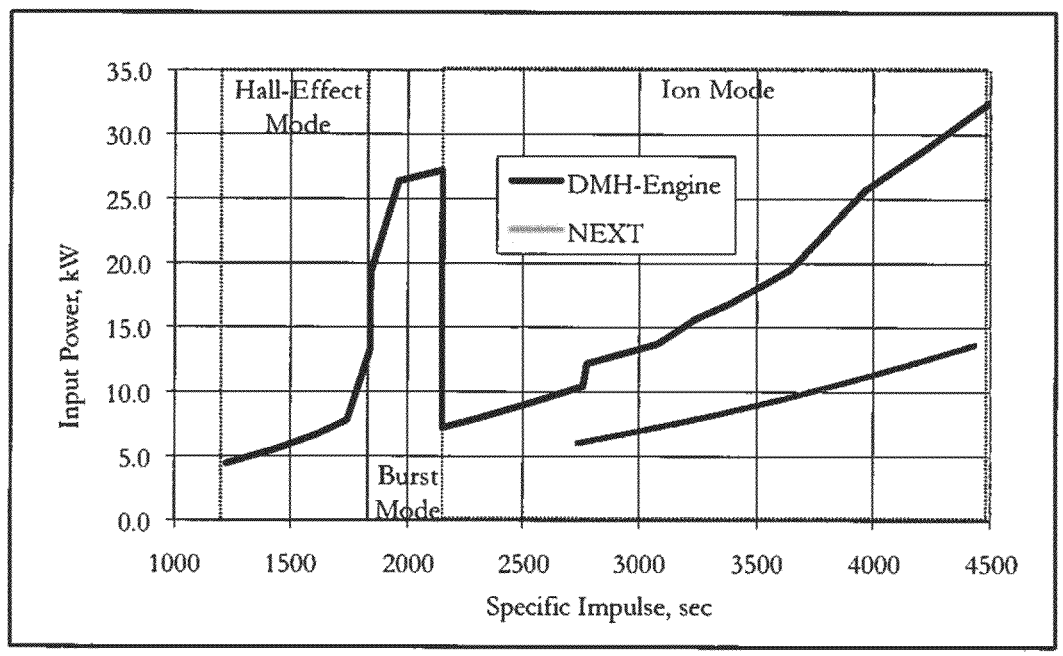
FIG. 14 is a plot illustrating input power and specific impulse for an exemplary electric propulsion machine.

With reference now to FIG. 14, input power vs. specific impulse for the dual thruster of Table 6 is graphed at 1410. For comparison, input power vs. specific impulse for the maximum input power of a NEXT ion thruster is graphed at 1420.

Figure 15:
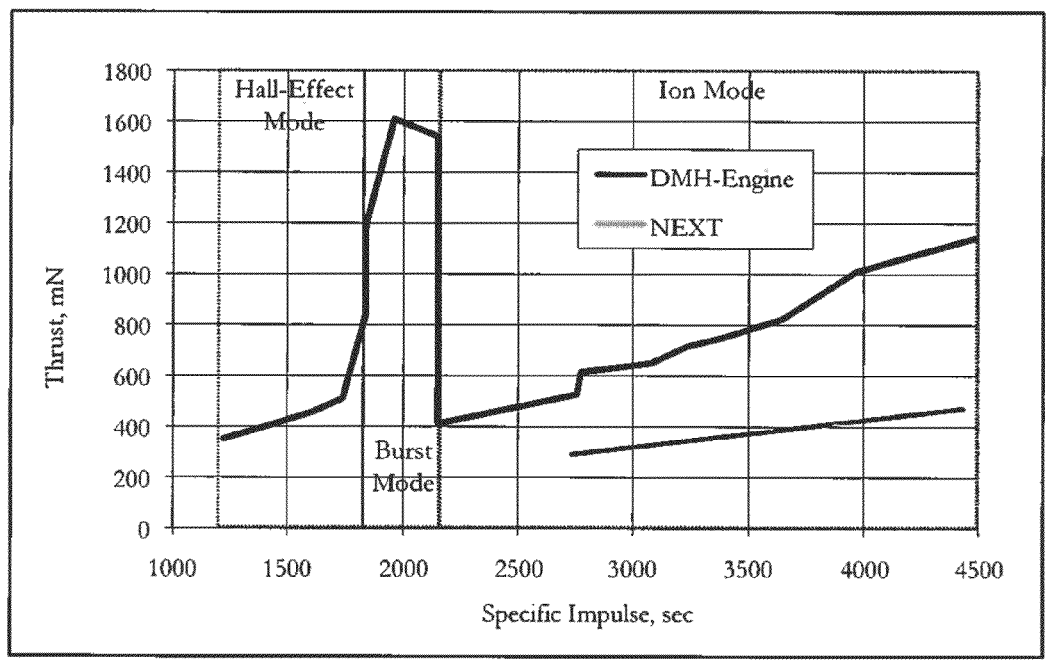
FIG. 15 is a plot illustrating thrust and specific impulse for an exemplary electric propulsion machine.

With reference now to FIG. 15, thrust vs. specific impulse for the dual thruster of Table 6 is graphed at 1510. For comparison, thrust vs. specific impulse for the maximum input power of a NEXT ion thruster is graphed at 1520.

Figure 16:
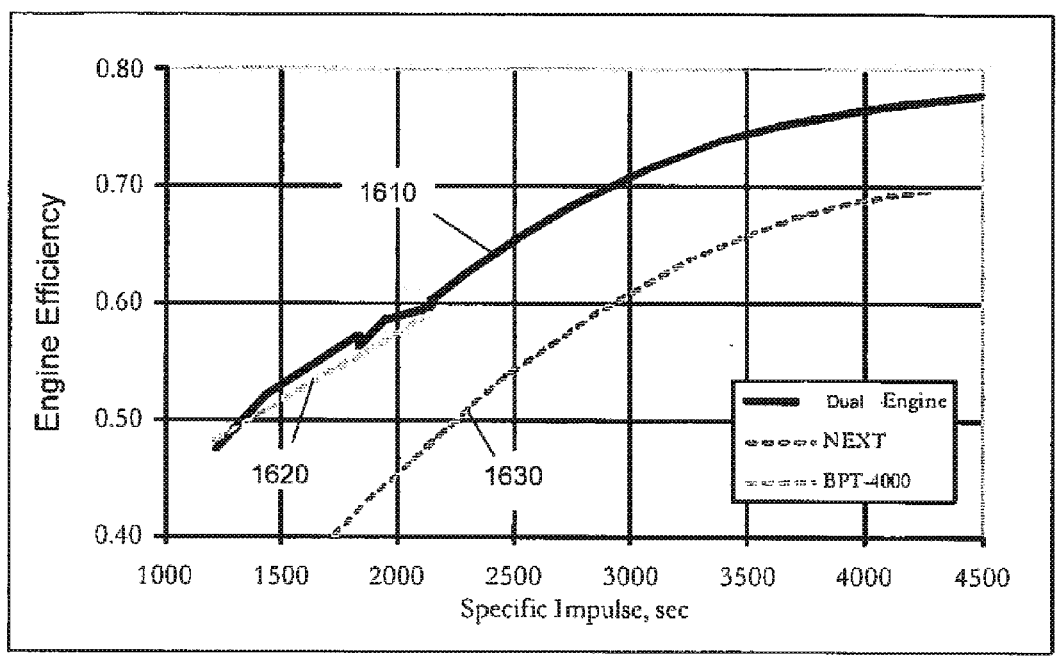
FIG. 16 is a plot illustrating engine efficiency vs. specific impulse of an exemplary electric propulsion machine.

With reference now to FIG. 16, engine efficiency vs. specific impulse of the dual thruster of Table 6 is graphed at 1610. For comparison, also plotted is efficiency data for a current Hall-effect thruster 1620 (BPT-4000) and a current ion thruster 1630 (NEXT). It is noted that the dual thruster curve 1610 represents the performance capability of a single device over the useful impulse range.

As seen in FIG. 16 a significant efficiency gain is expected for the dual thruster during operation in 'Ion Mode' (>2150 seconds specific impulse) as compared to current EPTs. These efficiency gains are due to the elimination of divergence-losses associated with the ion optics geometry, along with other efficiency gains as a consequence of the fact that the dual thruster is operating at much higher input power levels at a given specific impulse.

The dual thruster could be applied to any application for which the high thrust-to-power characteristics of a Hall-effect thruster and high specific impulse capability of an ion thruster would be advantageous. For example: those Earth-orbital applications requiring both primary and auxiliary electric propulsion functions; Earth-orbital applications requiring both rapid orbit changes and fuel-efficient less-time-critical orbital changes; and Planetary mission applications requiring both fuel-efficient high-delta-V transfers and on-orbit high thrust-to-power operations.

In one embodiment of a dual thruster, the Hall-effect or other suitable second thruster component and the ion component may have approximately the same input power capabilities at their nominal design specific impulses (about 2000 seconds for Hall-effect and 3600 seconds for ion). This geometry is referred to here as a 'Matched-Dual-Mode.' This configuration is that provided in the example case earlier, and would be appropriate if both components were required to perform a primary-propulsive application.

In an alternative embodiment, referred to here as a 'Mixed-Dual-Mode,' involves combining a Hall-effect or other suitable second thruster component and an ion component with markedly-different input power capabilities at their respective nominal design specific impulses. This may be most-appropriate if one component were required to provide primary propulsion and the other component provide auxiliary propulsion; for example, combining a high-power Hall-effect component core (such as the NASA GRC 300M) for rapid (Earth) orbital transfers with a low-power ion component (for example, beam area equivalent to the NASA NSTAR thruster) for station-keeping. These configuration options are captured in Table 7.

TABLE 7

|  | | Ion Component | | |
| --- | --- | --- | --- | --- |
|  | | Low-Power | Intermediate-Power | High-Power |
| Hall-Effect Component | Low-Power | Matched | Mixed | Mixed |
|  | Intermediate-Power | Mixed | Matched | Mixed |
|  | High-Power | Mixed | Mixed | Matched |

While the systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on provided herein. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicants' general inventive concept. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

As used herein, "connection" or "connected" means both directly, that is, without other intervening elements or components, and indirectly, that is, with another component or components arranged between the items identified or described as being connected. To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the claims (e.g., A or B) it is intended to mean "A or B or both". When the applicants intend to indicate "only A or B but not both" then the term "only A or B but not both" will be employed. Similarly, when the applicants intend to indicate "one and only one" of A, B, or C, the applicants will employ the phrase "one and only one". Thus, use of the term "or" herein is the inclusive, and not the exclusive use. See, Bryan A. Garner, A Dictionary of Modern Legal Usage 624 (2d. Ed. 1995).

The invention claimed is:

1. An electric propulsion thruster comprising:
an ion thruster comprising:
an annular discharge chamber surrounding a physically spaced central space, both the annular discharge chamber and the central space centered around a common axis, the annular discharge chamber having a closed end and an opposite exhaust annulus, the physically spaced central space extending from the closed end to the opposite exhaust annulus to form an outlet;
a discharge cathode operatively disposed within the annular discharge chamber;
an annular anode operatively disposed within the annular discharge chamber between the closed end and the exhaust end; and
ion optics operatively associated with the exhaust annulus.

2. The electric propulsion thruster as set forth in claim 1, further comprising a neutralizer cathode disposed along the common axis.

3. The electric propulsion thruster as set forth in claim 2, further comprising a Hall-effect thruster disposed within the central space surrounding the neutralizer cathode.

4. The electric propulsion thruster as set forth in claim 1, where the ion optics comprise a first substantially planar, annular electrode and a spaced second substantially planar, annular electrode.

5. The electric propulsion thruster as set forth in claim 4, where the ion optics comprise a ratio of a span to a gap less than 300:1, where the span comprises a distance from an inside radius to a larger outside radius of the ion optics and the gap comprises a distance from the first electrode to the second electrode.

6. The electric propulsion thruster as set forth in claim 1, where the anode comprises a surface area greater than 6000 $cm^2$.

7. The electric propulsion thruster as set forth in claim 1, where a ratio of an anode surface area to beam area is greater than 4:1.

8. The electric propulsion thruster as set forth in claim 3, further comprising a propellant feed for the ion thruster, a propellant feed for the Hall-effect thruster, and a propellant feed for the neutralizer cathode.

9. The electric propulsion thruster as set forth in claim 3, further comprising a plurality of radial passages between the Hall-effect thruster and the annular discharge chamber.

10. An electric propulsion thruster comprising:
a neutralizer cathode disposed on a central axis;
a Hall-effect thruster centered on the central axis; and
an ion thruster surrounding the Hall effect thruster comprising:
a discharge chamber having an exhaust annulus at one end;
an anode operatively disposed within the discharge chamber; and
first and second substantially planar annular electrodes operatively disposed adjacent to the exhaust annulus, the first and second substantially planar annular electrodes spaced from each other by a substantially uniform gap.

11. The electric propulsion thruster as set forth in claim 10, where the first and second substantially planar annular electrodes comprise a ratio of a span to the substantially uniform gap less than 300:1, where the span comprises a distance from an inside edge of one of the first or second annular electrodes to an outside edge of the same first or second annular electrodes.

12. The electric propulsion thruster as set forth in claim 10, where the anode comprises a surface area greater than 3.5 times than that of an area corresponding to a beam area.

13. The electric propulsion thruster as set forth in claim 10, further comprising a propellant feed for the ion thruster, a propellant feed for the Hall-effect thruster, and a propellant feed for the neutralizer cathode.

14. The electric propulsion thruster as set forth in claim 10, further comprising a plurality of radial passages between the Hall-effect thruster and the discharge chamber.

15. The electric propulsion thruster as set forth in claim 10, where the discharge chamber comprises an annular chamber surrounding the Hall effect thruster in communication with a substantially cylindrical discharge chamber underlying and mechanically supporting the Hall effect thruster.

16. The electric propulsion thruster as set forth in claim 10, comprising an engine efficiency greater than 0.70 at a specific impulse greater than 3000 seconds.

17. The electric propulsion thruster as set forth in claim 10, comprising an engine efficiency greater than 0.50 at a specific impulse greater than 1500 seconds and an engine efficiency greater than 0.65 at a specific impulse greater than 3000 seconds.

18. An electric propulsion machine comprising:
an ion thruster comprising:
an annular discharge chamber surrounding a central cylinder and centered upon an axis, the annular discharge chamber having an exhaust annulus, the central cylinder extending from a closed end to the exhaust annulus to form an outlet;
an annular anode operatively disposed within the annular discharge chamber between the closed end and the exhaust end, the anode including a surface area greater than 3.5 times than that of an area corresponding to a beam area; and
ion optics operatively associated with the exhaust annulus.

19. The electric propulsion machine as set forth in claim 18, further comprising an engine efficiency greater than 0.70 at a specific impulse greater than 3000 seconds.

20. The electric propulsion machine as set forth in claim 19, further comprising an engine efficiency greater than 0.50 at a specific impulse greater than 1500 seconds and an engine efficiency greater than 0.65 at a specific impulse greater than 3000 seconds.

* * * * *